John Tipton. Self Sustaining Hoof Expander.
No. 73675
PATENTED JAN 21 1868
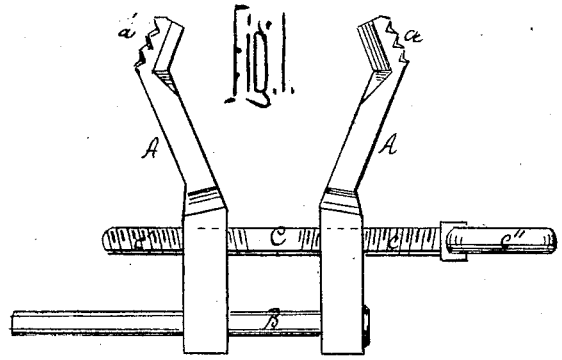
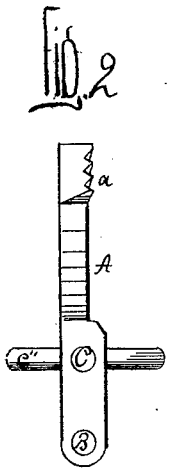
Witnesses
S. C. Hemon
C. A. Pettit
Inventor
John Tipton
By Munn & Co
Attorneys

United States Patent Office.

JOHN TIPTON, OF MALAGA, OHIO.

Letters Patent No. 73,675, dated January 21, 1868.

IMPROVED HOOF-EXPANDER.

*The Schedule referred to in these Letters Patent and making part of the same.*

TO ALL WHOM IT MAY CONCERN:

Be it known that I, JOHN TIPTON, of Malaga, in the county of Monroe, and State of Ohio, have invented a new and improved Self-Sustaining Hoof-Expander; and I do hereby declare the following to be a full, clear, and exact description of the same, reference being had to the accompanying drawings, forming part of this specification, and in which—

Figure 1 is a perspective view of my invention.

Figure 2 is a side elevation of the same.

In this invention two pieces of metal are made to fit into the cavity alongside of the frog of a horse's foot, and are then expanded by means of a screw-rod connecting them.

This invention is designed to expand the hoof of a horse in case of its contraction from corns or other diseases of the foot, or from any other cause.

In order that others skilled in the art to which my invention appertains may be enabled to make and use the same, I will proceed to describe it in detail.

In the drawings, A represents a piece of metal, having, at one extremity, a roughened outer edge, $a$, and its other extremity formed into a shank to receive the connecting-rod B, and the adjusting-rod C. A′ is another piece of metal, of similar shape, but working in the opposite direction upon the connecting-rod B. The rod B is firmly attached to the shank of the piece A, and upon it the piece A′ slides freely, the rod passing through a lateral hole in its shank. C, the adjusting or expanding-rod, is a stout rod of iron, provided with a screw-thread, $c$, at one end working in one direction, and another screw-thread, $c'$, at the opposite end, working in the opposite direction. It has also a handle, $c''$, by which it can be turned with as much force as may be required. The pieces A and A′ are made of suitable size and shape to fit into the cavities on each side of the frog of a horse's foot, the roughened edges $a\ a'$ being placed towards the toe, and the shanks of the pieces A A′ being placed at the heel. By means of the screw-rod C the pieces A A′ are then screwed apart, as far as may be necessary, and the horse's hoof expanded to the extent required. The screw-threads $c\ c'$, running in directions opposite to each other, screw the pieces A A′ apart equally and uniformly, and thereby insure the uniform expansion of the hoof.

The instrument thus formed is cheap, simple, and durable, and has been fully tested and found to be admirably adapted to the purpose required.

Having thus described my invention, what I claim as new, and desire to secure by Letters Patent, is—

The instrument above described, when constructed and used substantially as and for the purpose specified.

JOHN TIPTON.

Witnesses:
EDWARD L. GRISELL,
ISAAC BOOTH.